(12) United States Patent
Sekine

(10) Patent No.: US 10,298,889 B2
(45) Date of Patent: May 21, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hisato Sekine, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 10 days.

(21) Appl. No.: 15/627,641

(22) Filed: Jun. 20, 2017

(65) Prior Publication Data

US 2017/0374293 A1 Dec. 28, 2017

(30) Foreign Application Priority Data

Jun. 24, 2016 (JP) .................................. 2016-125786

(51) Int. Cl.
*G06T 3/40* (2006.01)
*G06T 5/00* (2006.01)
(Continued)

(52) U.S. Cl.
CPC ........... *H04N 9/04513* (2018.08); *G06T 3/40* (2013.01); *G06T 5/009* (2013.01); *G06T 5/50* (2013.01); *H04N 1/3871* (2013.01); *H04N 1/407* (2013.01); *H04N 5/202* (2013.01); *H04N 5/2353* (2013.01); *H04N 5/2356* (2013.01); *H04N 5/35572* (2013.01); *G06T 2207/10016* (2013.01); *G06T 2207/10144* (2013.01); *G06T 2207/20212* (2013.01)

(58) Field of Classification Search
CPC .... H04N 5/202; H04N 5/2353; H04N 5/2356; H04N 9/04513
See application file for complete search history.

(56) References Cited

U.S. PATENT DOCUMENTS 6,747,694 B1 * 6/2004 Nishikawa ............. H04N 5/235
348/223.1
7,468,746 B2 * 12/2008 Sugimoto .............. H04N 5/235
348/224.1

(Continued)

FOREIGN PATENT DOCUMENTS

JP 2002135648 A 5/2002
JP 2004120205 A 4/2004

*Primary Examiner* — Daniel M Pasiewicz
(74) *Attorney, Agent, or Firm* — Rossi, Kimms & McDowell LLP

(57) ABSTRACT

An image processing apparatus that generates a combined image by performing gamma processing and combination processing for a plurality of images obtained by capturing images of the same image capturing-target scene under different exposure conditions and includes: an acquisition unit configured to acquire adjustment parameters that adjust gamma characteristics applied to the gamma processing in accordance with a dynamic range of the image capturing-target scene; a gamma processing unit configured to perform the gamma processing to which adjustment parameters acquired by the acquisition unit have been applied for the plurality of images; and a combination unit configured to generate the combined image by performing the combination processing for the plurality of images for which the gamma processing has been performed by the gamma processing unit.

13 Claims, 8 Drawing Sheets

(51) Int. Cl.
*G06T 5/50* (2006.01)
*H04N 9/04* (2006.01)
*H04N 1/387* (2006.01)
*H04N 1/407* (2006.01)
*H04N 5/202* (2006.01)
*H04N 5/235* (2006.01)
*H04N 5/355* (2011.01)

(56) References Cited

U.S. PATENT DOCUMENTS

| | | | |
|---|---|---|---|
| 7,609,320 B2 | 10/2009 | Okamura | |
| 7,649,554 B2 * | 1/2010 | Suzuki | H04N 5/235 |
| | | | 348/216.1 |
| 2007/0296849 A1 * | 12/2007 | Sano | H04N 5/235 |
| | | | 348/362 |
| 2012/0327270 A1 * | 12/2012 | Shirakawa | H04N 5/2355 |
| | | | 348/239 |

* cited by examiner

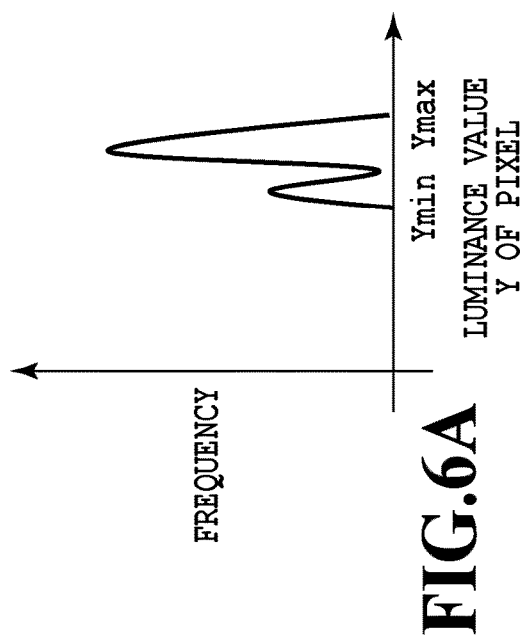
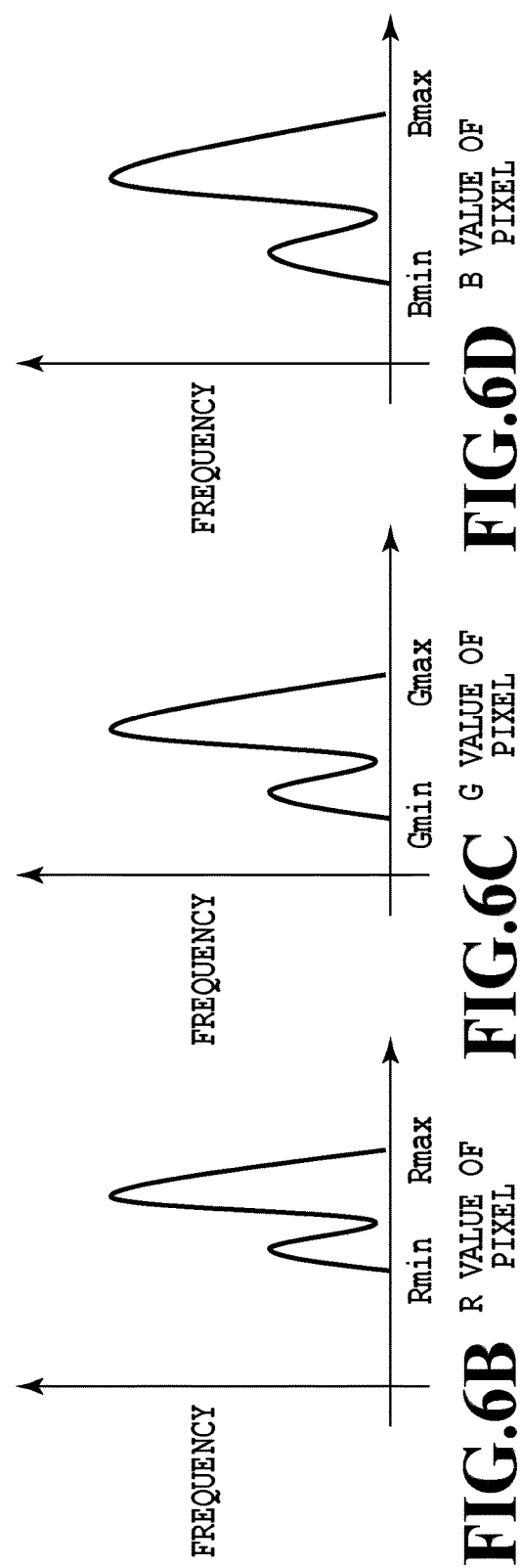

IMAGE PROCESSING APPARATUS, IMAGE PROCESSING METHOD, AND STORAGE MEDIUM

BACKGROUND OF THE INVENTION

Field of the Invention

The present invention relates to a technique to generate a high dynamic range image.

Description of the Related Art

In general, the dynamic range of an image sensor, such as a CCD and a CMOS, used in an image capturing apparatus, such as a digital camera and a digital video camera, is narrow compared to the dynamic range in the natural world. Because of this, in the case where the image of an image capturing-target scene having a wide dynamic range (referred to as a high dynamic range and in the present specification, abbreviated to "HDR") is captured by a common method, blocked up shadows, blown out highlights, and so on occur. As a technique to capture the image of a scene having such a wide dynamic range (in the present specification, referred to as an HDR scene), there is a method of acquiring the image of an HDR scene by capturing a plurality of images with different exposure times and combining the obtained plurality of images. That is, level matching and gamma processing are performed for a plurality of images captured with different exposure times based on the exposure times. Then, by selecting an optimum pixel for each area from among the images for which the level matching and gamma processing have been performed, the image of an HDR scene is acquired. Hereinafter, such a combination method is referred to as HDR combination.

However, in the case where the HDR combination is applied to a scene having a dynamic range different from the supposed one, there is a possibility that an image that extremely lacks contrast is generated. Consequently, it is necessary to acquire images under an exposure condition optimum for the dynamic range of the scene and to perform optimum HDR combination. The image capturing apparatus of Japanese Patent Laid-Open No. 2002-135648 determines the exposure condition optimum for a scene and performs image capturing and combination by calculating the dynamic range of the scene from histograms of preliminary captured images and determining the exposure condition at the time of the main image capturing. Further, in the image outputting method of Japanese Patent Laid-Open No. 2004-120205, the image optimum for the dynamic range of a scene is generated by calculating the dynamic range of the scene for the image after the HDR combination by the histogram analysis and performing the gamma correction again for the image after the combination based on the results of the calculation.

However, in the image capturing apparatus of Japanese Patent Laid-Open No. 2002-135648, the exposure condition at the time of the main image capturing is changed in accordance with the dynamic range of the scene calculated from the histograms of the preliminary captured images. Because of this, it is necessary to prepare parameters required to perform the HDR combination for each dynamic range of the scene, and therefore, a very large number of combinations of parameters will be necessary.

Further, with the image outputting method of Japanese Patent Laid-Open No. 2004-120205, the gamma correction is performed again for the image after the HDR combination, and therefore, unless a sufficient number of bits is secured, a pseudo contour occurs in the image after the gamma correction. That is, in the case where the gamma correction is performed again for the image after the HDR combination, the deterioration of the image quality (bit dropout) due to the gamma correction performed two or more times, or the increase in the data amount due to the bit expansion will be problematic.

Consequently, the present invention provides an image processing apparatus capable of generating a combined image of high image quality by HDR combination with a small number of bits without requiring the preparation of a very large number of parameters for scenes having a variety of dynamic ranges.

SUMMARY OF THE INVENTION

The image processing apparatus according to the present invention is an image processing apparatus that generates a combined image by performing gamma processing and combination processing for a plurality of images obtained by capturing images of the same image capturing-target scene under different exposure conditions, and the image processing apparatus includes: an acquisition unit configured to acquire adjustment parameters that adjust gamma characteristics applied to the gamma processing in accordance with a dynamic range of the image capturing-target scene; a gamma processing unit configured to perform the gamma processing to which the adjustment parameters acquired by the acquisition unit have been applied for the plurality of images; and a combination unit configured to generate the combined image by performing the combination processing for the plurality of images for which the gamma processing has been performed by the gamma processing unit.

Further features of the present invention will become apparent from the following description of exemplary embodiments with reference to the attached drawings.

BRIEF DESCRIPTION OF THE DRAWINGS

FIG. 6A to FIG. 6D are diagrams for explaining adjustment parameter calculation processing of the first embodiment;

DESCRIPTION OF THE EMBODIMENTS

In the following, embodiments of the present invention are explained with reference to the drawings. However, the following embodiments do not limit the present invention and all the combinations of features explained below are not necessarily indispensable to solve the problem of the present invention. In each drawing referred to in the following explanation, as a principle, the same symbol is attached to the element equivalent to that in another drawing.

First Embodiment

In the present embodiment, first, after performing development processing, such as white balance, demosaicking, and gamma processing, for a plurality of images captured under different exposure conditions, HDR combination is performed. Next, histogram analysis is performed for the image for which the HDR combination has been performed and based on the results of the analysis, adjustment parameters to adapt the gamma processing to the dynamic range of an image capturing-target scene are calculated. Then, the main gamma processing to which the calculated adjustment parameters have been applied is performed for the plurality of captured images.

Figure 1A:
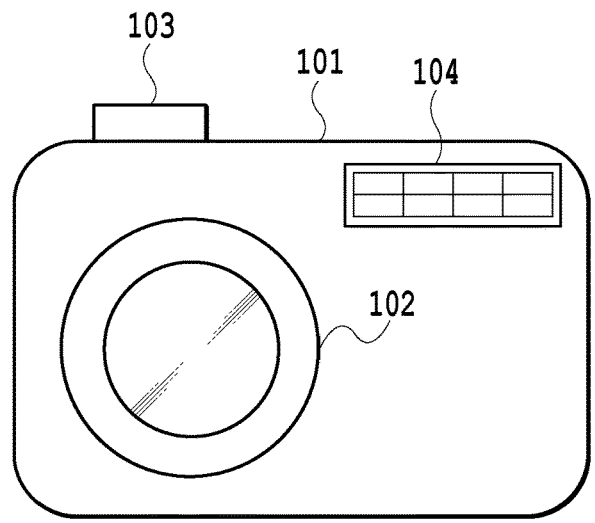
FIG. 1A and FIG. 1B are each a diagram showing an external appearance of an image capturing apparatus in a first embodiment.
Figure 1B:
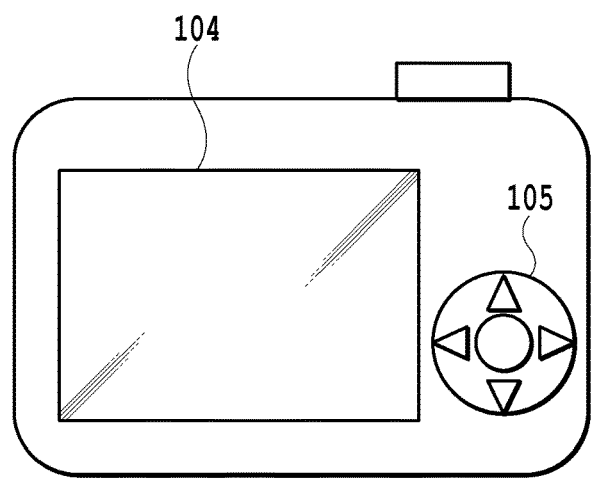

FIG. 1A and FIG. 1B are each a diagram showing the external appearance of an image capturing apparatus that can be adapted to the present embodiment. In the present embodiment, as an example configuring an image capturing apparatus, a configuration example of a digital camera is illustrated. Although description is given to a digital camera, but the configuration example is not limited to this. For example, the configuration example may be an information processing apparatus or device, such as a mobile telephone, a tablet device, and a personal computer, or the image capturing apparatus may be configured as an image capturing apparatus of a camera-attached mobile telephone and the like.

FIG. 1A shows an external appearance of the front side of an image capturing apparatus 101 and FIG. 1B shows the external appearance of the rear side. The image capturing apparatus 101 includes an optical unit 102, an image capturing button 103, a display unit 104, and an operation button 105. The optical unit 102 includes a zoom lens, a focus lens, a camera-shake correction lens, an aperture stop, and a shutter and collects light information on a subject. The image capturing button 103 is a button for a user to give instructions to start image capturing to the image capturing apparatus 101. As the display unit 104, a liquid crystal display or the like is used and the display unit 104 displays an image processed by the image capturing apparatus 101, various kinds of data, and so on. The operation button 105 is a button for a user to specify parameters of exposure conditions and the like to the image capturing apparatus 101.

Figure 2:
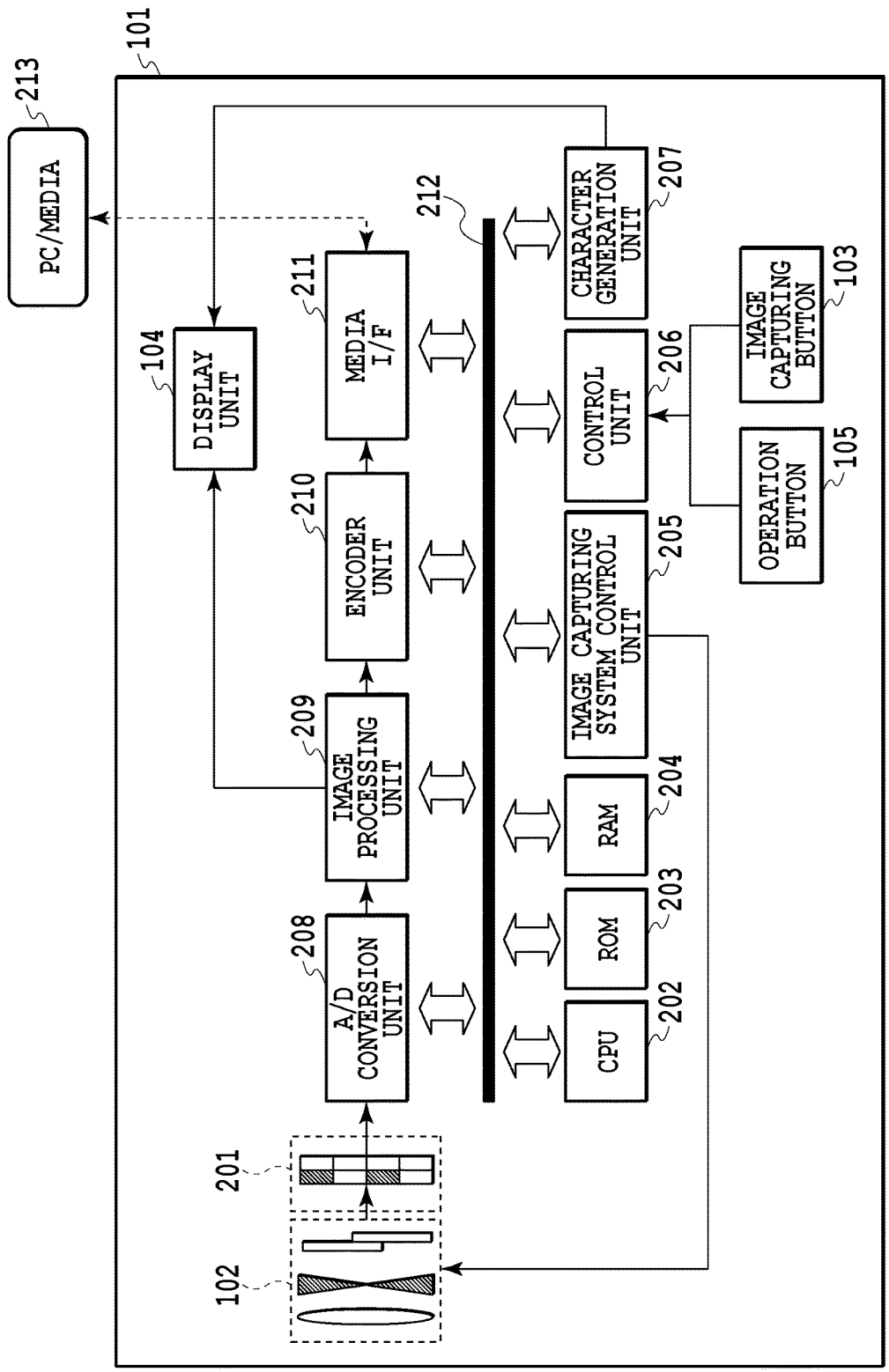
FIG. 2 is a block diagram showing an internal configuration of the image capturing apparatus in the first embodiment.

FIG. 2 is a block diagram showing an internal configuration of the image capturing apparatus 101 in the present embodiment. A color image sensing element unit 201 is an element that converts light information collected by the optical unit 102 into a current value and acquires color information by being combined with a color filter or the like.

A CPU 202 is a processor that centralizedly controls each configuration within the image capturing apparatus 101. A ROM (Read Only Memory) 203 is a memory that stores a program group executed by the CPU 202. A RAM (Random Access Memory) 204 is a memory that functions as a main memory, a work area, and so on, of the CPU 202. The CPU 202 performs processing in accordance with programs stored in the ROM (Read Only Memory) 203 or programs loaded onto the RAM 204.

An image capturing system control unit 205 performs control specified by the CPU 202, such as focusing, shutter opening, and aperture stop adjustment. A control unit 206 performs control to start and end the image capturing operation based on instructions input by a user via the image capturing button 103 or the operation button 105. A character generation unit 207 generates characters, graphics, and so on.

An A/D conversion unit 208 converts a light quantity of a subject detected by the optical unit 102 into a digital signal value and generates a RAW image. In the present embodiment, explanation is given by an example in which the RAW image is an image having only one color of R, G, and B in each pixel.

An image processing unit 209 performs image processing including white balance processing, demosaicking processing, gamma processing, and HDR combination for the above-described RAW image. An encoder unit 210 converts an image, which is the results of the processing by the image processing unit 209, into a file format, such as a Jpeg.

A media I/F 211 is an interface for performing transmission and reception of image data with a PC/media 213 (e.g., hard disk, memory card, CF card, SD card, and so on). A system bus 212 is a bus for performing transmission and reception of various kinds of data with each configuration within the image capturing apparatus 101.

Figure 3:
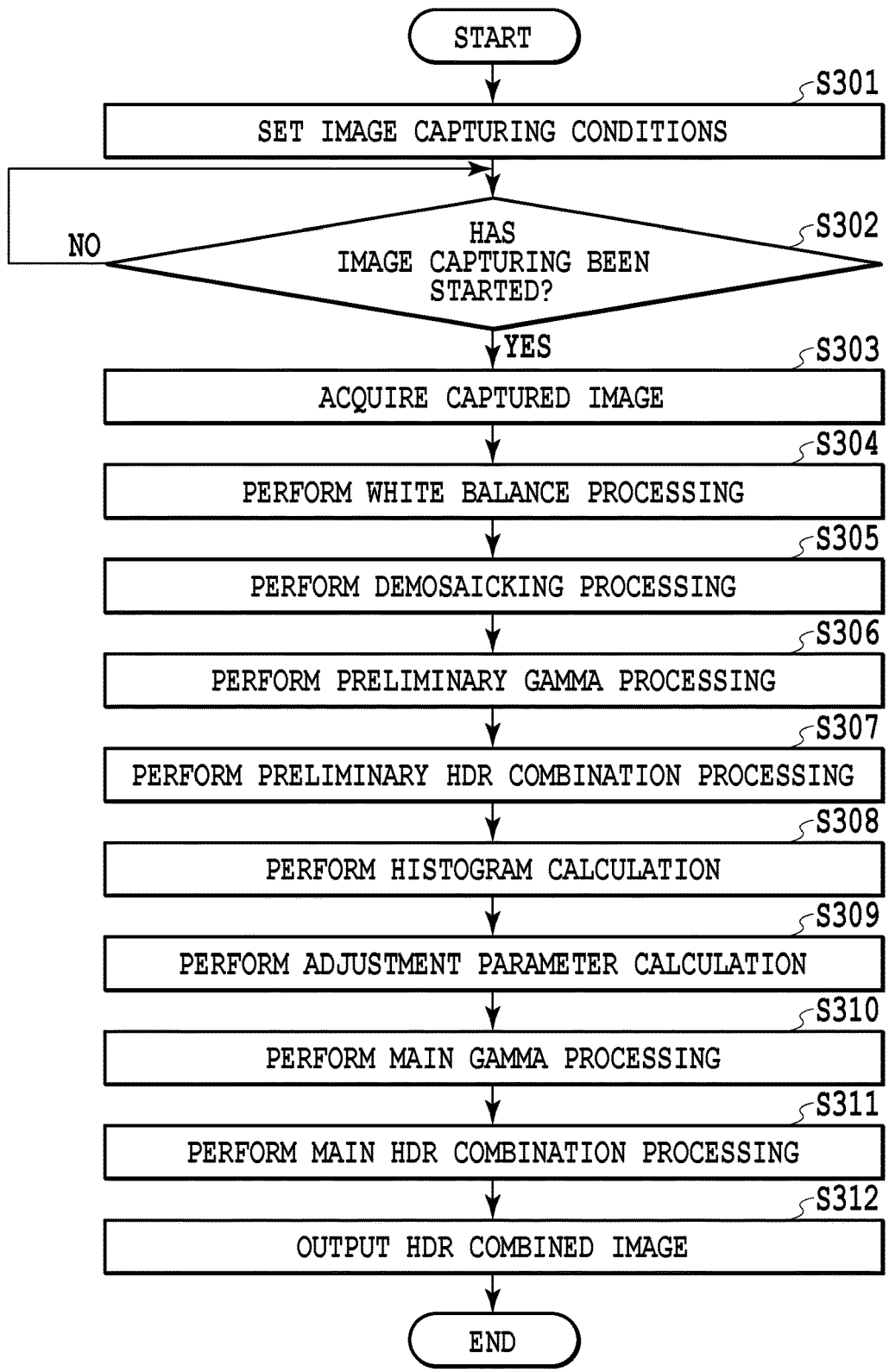
FIG. 3 is a flowchart of entire processing of the image capturing apparatus in the first embodiment.
Figure 4:
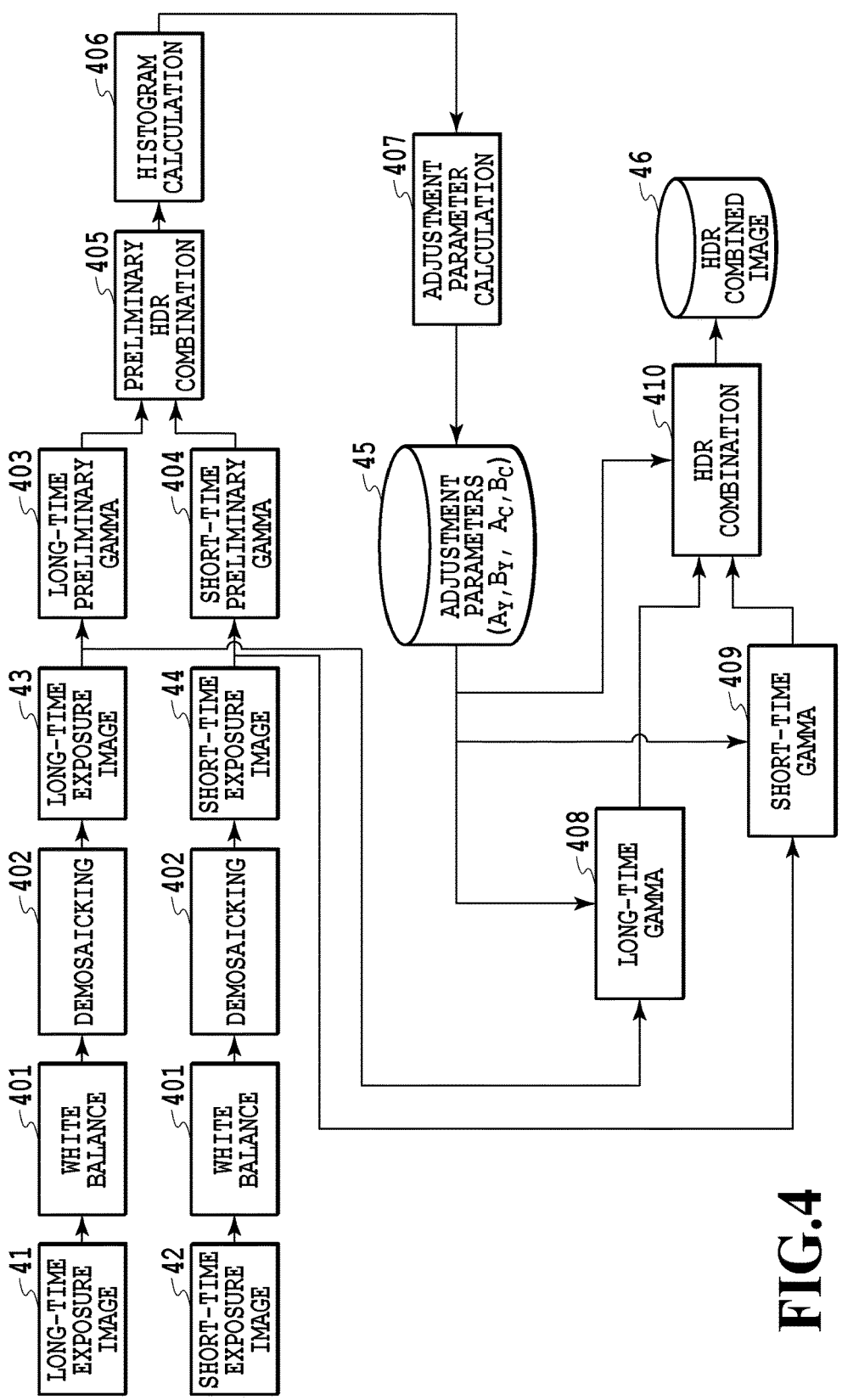
FIG. 4 is a diagram showing details of image processing performed by an image processing unit in the first embodiment.

FIG. 3 is a flowchart of entire processing of the image capturing apparatus 101 of the present embodiment. FIG. 4 is a diagram showing details of image processing performed by the image processing unit 209. In the following, with reference to FIG. 3 and FIG. 4, detailed explanation is given.

At step S301, a user sets exposure conditions, such as an f-stop of a lens and an ISO speed, via the operation button 105. The exposure time is not changed for each scene, but a condition prepared in advance is set. In the present embodiment, explanation is given by taking image capturing of an HDR scene with two kinds of exposure time as an example. In the following, an image captured with the relatively short exposure time of the two kinds of exposure time is called a short-time exposure image and an image captured with the relatively long exposure time is called a long-time exposure image.

At step S302, the control unit 206 determines whether or not the image capturing button 103 has been pressed down. In the case where the image capturing button 103 has been pressed down, the processing advances to step S303 and in the case where the image capturing button 103 has not been pressed down, the processing returns to step S301.

At step S303, the control unit 206 sets the focus position by auto focusing and sets the exposure conditions (image capturing parameters) set by a user at step S301 to the image capturing system control unit 205 and instructs the image capturing system control unit 205 to start the image capturing operation. Then, the image capturing system control unit 205 performs control so that image capturing is performed a plurality of times with different exposure times (exposure bracket image capturing) based on the set exposure conditions. Specifically, the image capturing system control unit 205 acquires the light quantity of a subject by driving the optical unit 102 and further, the A/D conversion unit 208 acquires a RAW image by converting the acquired light quantity of a subject into a digital signal value. In the present embodiment, as the RAW image, a long-time exposure image 41 captured with a long exposure time (e.g., $\frac{1}{120}$ sec) and a short-time exposure image captured with a short exposure time (e.g., $\frac{1}{2000}$ sec) for the same scene are acquired and input to the image processing unit 209.

At step S304, the image processing unit 209 performs white balance processing 401 for the input long-time exposure image 41 and short-time exposure image 42, respectively. At step S305, the image processing unit 209 performs demosaicking processing 402 for the images, respectively, for which the white balance processing has been performed at step S304. Due to this, a long-time exposure image 43 and a short-time exposure image 44 are acquired.

At step S306, the image processing unit 209 performs long-time preliminary gamma processing 403 and short-time preliminary gamma processing 404 for the long-time exposure image 43 and the short-time exposure image 44, respectively, acquired at step S305. Details of the preliminary gamma processing at this step will be described later.

At step S307, the image processing unit 209 performs preliminary HDR combination processing 405 for the image for which the preliminary gamma processing has been performed at step S306. In the following, the image as the results of the preliminary HDR combination processing is called a preliminary HDR combined image. Details of the preliminary HDR combination processing at this step will be described later.

At step S308, the image processing unit 209 performs histogram calculation 406 for the preliminary HDR combined image as the results of the processing at step S307. The histogram calculation is performed for each of a luminance value Y and R, G, and B values of the preliminary HDR combined image.

At step S309, the image processing unit 209 performs adjustment parameter calculation (407) based on the histograms calculated at step S308. That is, the image processing unit 209 calculates adjustment parameters 45 that adjust the gamma characteristics applied to the gamma processing in accordance with the dynamic range of a scene. Details of the adjustment parameter calculation at this step will be described later.

At step S310, the image processing unit 209 performs the main gamma processing for the long-time exposure image 43 and the short-time exposure image 44, respectively, acquired at step S305 based on the adjustment parameters 45 calculated at step S309. That is, long-time gamma processing 408 and short-time gamma processing 409 are performed.

At step S311, the image processing unit 209 performs HDR combination processing 410 for the image for which the main gamma processing has been performed at step S310 and generates a combined image 46. Details of the HDR combination processing at this step will be described later.

At step S312, the image processing unit 209 outputs the combined image 46 generated at step S311 to the encoder unit 210, to the PC/media 213 via the media I/F 211, and so on.

In the present embodiment, the image processing unit 209 calculates the luminance value Y and color difference values U and V from the R, G, and B values of an input image. That is, the image processing unit 209 performs color space conversion processing from RGB→YUV. Then, the image processing unit 209 calculates the luminance value Y and the color difference values U and V after the gamma correction by performing log gamma correction on the YUV color space. Further, the image processing unit 209 calculates the R, G, and B values after the gamma correction from the luminance value Y and the color difference values U and V after the gamma correction.

<Preliminary Gamma Processing>

The preliminary gamma processing of the present embodiment is gamma processing based on predetermined gamma characteristics. In the following, as the preliminary gamma processing at step S306, the long-time preliminary gamma processing 403 performed for the long-time exposure image 43 and the short-time preliminary gamma processing 404 performed for the short-time exposure image 44 are explained in detail.

For the long-time exposure image 43, the long-time preliminary gamma processing 403 is performed by expression (1) below. Here, it is assumed that the R, G, and B values of the long-time exposure image 43 are $R_{long}$, $G_{long}$, and $B_{long}$, respectively, and the R, G, and B values after the gamma correction are $R_{long}'$, $G_{long}'$, and $B_{long}'$, respectively. Further, it is assumed that the luminance value Y and the color difference values U and V of the long-time exposure image 43 are $Y_{long}$, $U_{long}$, and $V_{long}$, respectively, and the luminance value Y and the color difference values U and V after the gamma correction are $Y_{long}'$, $U_{long}'$, and $V_{long}'$, respectively. Furthermore, Max and $O_{max}$ are gamma correction coefficients set in advance and Max is set to the upper limit value of the luminance value Y before the preliminary gamma correction and $O_{max}$ is set to the upper limit value of the luminance value Y after the preliminary gamma correction, respectively. For example, it is possible to set Max to $2^{23}-1$ and $O_{max}$ to 1,023 in the case where a 10-bit output is produced.

expression (1)

$$Y_{long} = 0.257 * R_{long} + 0.504 * G_{long} + 0.114 * B_{long}$$

$$U_{long} = -0.169 * R_{long} - 0.331 * G_{long} + 0.500 * B_{long}$$

$$V_{long} = 0.500 * R_{long} - 0.419 * G_{long} - 0.081 * B_{long}$$

$$Y_{long}' = \frac{O_{max}}{\log(\text{Max})} \log(Y_{long})$$

$$U_{long}' = \frac{O_{max}}{\log(\text{Max})} \log(U_{long})$$

$$V_{long}' = \frac{O_{max}}{\log(\text{Max})} \log(V_{long})$$

$$R_{long}' = 1.00 * Y_{long}' + 1.402 * V_{long}'$$

$$G_{long}' = 1.00 * Y_{long}' - 0.344 * U_{long}' + 1.402 * V_{long}'$$

$$B_{long}' = 1.00 * Y_{long}' + 1.772 * U_{long}'$$

Further, for the short-time exposure image 44, the short-time preliminary gamma processing 404 is performed by expression (2) below. Here, it is assumed that the R, G, and B values of the short-time exposure image 44 are $R_{short}$, $G_{short}$, and $B_{short}$, respectively, and the R, G, and B values after the gamma correction are $R_{short}'$, $G_{short}'$, and $B_{short}'$, respectively. Further, it is assumed that the luminance value Y and the color difference values U and V of the short-time exposure image 44 are $Y_{short}$, $U_{short}$, and $V_{short}$, respectively, and the luminance value Y and the color difference values U and V after the gamma correction are $Y_{short}'$, $U_{short}'$ and $V_{short}'$, respectively. Furthermore, it is assumed that the exposure time of the short-time exposure image 44 is $t_{short}$ and the exposure time of the long-time exposure image 43 is $t_{long}$.

expression (2)

$$Y_{short} = 0.257 * R_{short} + 0.504 * G_{short} + 0.114 * B_{short}$$

$$U_{short} = -0.169 * R_{short} - 0.331 * G_{short} + 0.500 * B_{short}$$

-continued $$V_{short} = 0.500 * R_{short} - 0.419 * G_{short} - 0.081 * B_{short}$$

$$Y'_{short} = \frac{O_{max}}{\log(Max)} \log\left(\frac{t_{long}}{t_{short}} Y_{short}\right)$$

$$U'_{short} = \frac{O_{max}}{\log(Max)} \log\left(\frac{t_{long}}{t_{short}} U_{short}\right)$$

$$V'_{short} = \frac{O_{max}}{\log(Max)} \log\left(\frac{t_{long}}{t_{short}} V_{short}\right)$$

$$R'_{short} = 1.00 * Y'_{short} + 1.402 * V'_{short}$$

$$G'_{short} = 1.00 * Y'_{short} - 0.344 * U'_{short} + 1.402 * V'_{short}$$

$$B'_{short} = 1.00 * Y'_{short} + 1.772 * U'_{short}$$

<Preliminary HDR Combination Processing>

Details of the preliminary HDR combination processing 405 at step S307 are explained with reference to FIG. 5. For the long-time exposure image and the short-time exposure image for which the preliminary gamma processing has been performed at step S306, the preliminary HDR combination processing 405 is performed by expression (3) below.

$$\text{Out}(x,y) = A \times I_{short}(x,y) + (1-A) \times I_{long}(x,y) \quad \text{expression (3)}$$

Here, x and y indicate a pixel position. Out (x, y) is a pixel value (R, G, and B values) stored at the pixel position (x, y) of the output image after the combination. $I_{short}$ (x, y) is a pixel value stored at the pixel position (x, y) of the short-time exposure image after the preliminary gamma processing has been applied, i.e., $R_{short}'$(x, y), $G_{short}'$(x, y), and $B_{short}'$(x, y). $I_{long}$ (x, y) is a pixel value stored at the pixel position (x, y) of the long-time exposure image after the preliminary gamma processing has been applied, i.e., $R_{long}'$ (x, y), $G_{long}'$(x, y), and $B_{long}'$(x, y). Further, A is a composite coefficient value stored at the pixel position (x, y) of a composite coefficient map. The composite coefficient map is a map that stores the composite coefficient value of the short-time exposure image used in the preliminary HDR combination processing for each pixel. In the following, a generation method of the composite coefficient map is explained.

Figure 5:
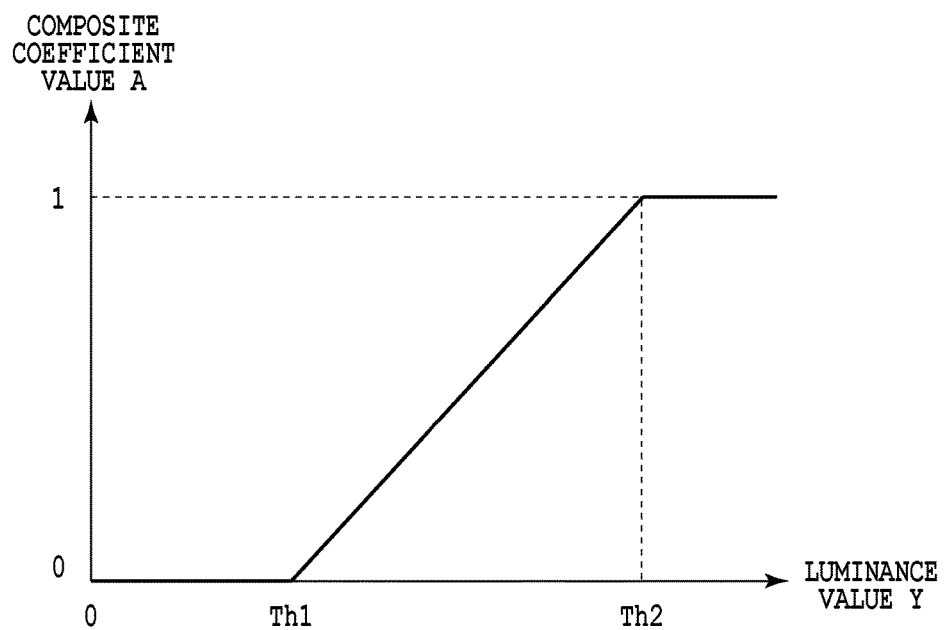
FIG. 5 is a diagram showing a relationship between a luminance value map and a composite coefficient value used in HDR image combination processing of the first embodiment.

FIG. 5 is a graph to determine the composite coefficient value A of the composite coefficient map for the luminance value. The composite coefficient map in the present embodiment is a map that stores composite coefficient values of the short-time exposure image and generated based on the short-time exposure image after the preliminary gamma processing has been applied and the graph in FIG. 5. Specifically, from a pixel value $I_{short}$ (R, G, B values) of the short-time exposure image, the luminance value of each pixel is calculated and smoothing processing is performed for the calculated luminance value. To the smoothing processing, it is possible to apply, for example, a 5×5 Gaussian filter. Then, for the luminance value after the smoothing processing, the composite coefficient value A of the composite coefficient map is determined based on the graph in FIG. 5. As shown in FIG. 5, a threshold value Th1 and a threshold value Th2 are set and in the case where the luminance value is smaller than or equal to the threshold value Th1, the composite coefficient value A is determined to be 0 and in the case where the luminance value is larger than or equal to the threshold value Th2, the composite coefficient value A is determined to be 1. Further, in the case where the luminance value is between the threshold value Th1 and the threshold value Th2, as the composite coefficient value A, the results of performing linear interpolation are used. As described above, the composite coefficient value A at each pixel is determined and the composite coefficient map is generated.

In the present embodiment, explanation is given on the assumption that the composite coefficient value A is determined by having the two threshold values and performing interpolation, but the determination method of the composite coefficient value A is not limited to this. For example, it may also be possible to determine the composite coefficient value A by having three or more threshold values and performing interpolation, or to determine the composite coefficient value A by using another expression.

<Adjustment Parameter Calculation>

Details of the adjustment parameter calculation at step S309 are explained with reference to FIG. 6A to FIG. 6D. FIG. 6A to FIG. 6D are diagrams for explaining adjustment parameter calculation processing of the present embodiment and show an example in which histograms of the luminance value Y and the R, G, and B values are calculated for a preliminary combined image. In the case where the maximum values and the minimum values of each histogram are taken to be Ymin, Ymax, Rmin, Rmax, Gmin, Gmax, Bmin and Bmax, adjustment parameters Ay and By for the luminance value and adjustment parameters Ac and Bc for the color difference value are calculated by expression (4) below.

$$\begin{cases} Ay = \dfrac{M_{out}}{Y\max - Y\min} \\ By = Ay \cdot Y\min \end{cases} \quad \text{expression (4)}$$

$$\begin{cases} Ac = \dfrac{M_{out}}{C\max - C\min} \\ Bc = Ac \cdot C\min \\ C\min = \min(R\min, G\min, B\min) \\ C\max = \max(R\max, G\max, B\max) \end{cases}$$

Here, $M_{out}$ is a coefficient set in advance. For example, it is possible to set $M_{out}$ to 1,023 in the case where the number of output bits is ten. As is expressed by expression (4), as the difference between Ymin and Ymax becomes large, Ay becomes small. As Ymin becomes small, By becomes small. Further, as the difference between Cmin and Cmax becomes large, Ac becomes small. As Cmin becomes small, Bc becomes small. For example, in the case where Ymin and Ymax are 500 and 800, respectively, Ay is 3.41 and By is 1,705. Further, in the case where Ymin and Ymax are 750 and 800, respectively, Ay is 20.46 and By is 15,345.

<Main Gamma Processing>

As the main gamma processing at step S310, the long-time gamma processing 408 performed for the long-time exposure image 43 and the short-time gamma processing 409 performed for the short-time exposure image 44 are explained in detail.

For the long-time exposure image 43, the long-time gamma processing 408 is performed by expression (5) below. Here, it is assumed that the R, G, and B values of the input of the long-time exposure image 43 are $R_{long}$, $G_{long}$, and $B_{long}$, respectively, and the R, G, and B values after the gamma correction are $R_{long}'$, $G_{long}'$, and $B_{long}'$, respectively. Further, it is assumed that the luminance value Y and the color difference values U and V of the long-time exposure image 43 are $Y_{long}$, $U_{long}$, and $V_{long}$, respectively, and the luminance value Y and the color difference values U and V after the gamma correction are $Y_{long}'$, $U_{long}'$, and $V_{long}'$, respectively. Furthermore, Max and $O_{max}$ are the same as those explained in expression (1), i.e., the gamma correction coefficients set in advance. Still furthermore, the adjustment parameters Ay, By, Ac, and Bc are the parameters calculated at step S309.

expression (5)

$$Y_{long} = 0.257 * R_{long} + 0.504 * G_{long} + 0.114 * B_{long}$$

$$U_{long} = -0.169 * R_{long} - 0.331 * G_{long} + 0.500 * B_{long}$$

$$V_{long} = 0.500 * R_{long} - 0.419 * G_{long} - 0.081 * B_{long}$$

$$Y'_{long} = Ay \cdot \frac{O_{max}}{\log(\text{Max})} \log(Y_{long}) - By$$

$$U'_{long} = Ac \cdot \frac{O_{max}}{\log(\text{Max})} \log(U_{long}) - Bc$$

$$V'_{long} = Ac \cdot \frac{O_{max}}{\log(\text{Max})} \log(V_{long}) - Bc$$

$$R'_{long} = 1.00 * Y'_{long} + 1.402 * V'_{long}$$

$$G'_{long} = 1.00 * Y'_{long} - 0.344 * U'_{long} + 1.402 * V'_{long}$$

$$B'_{long} = 1.00 * Y'_{long} + 1.772 * U'_{long}$$

Ay and Ac are parameters that can adjust the slope of the output value for the input value in the gamma processing. Specifically, as expressed in expression (5), as Ay becomes small, the slope of $Y_{long}'$ for log ($Y_{long}$) becomes small and as Ac becomes small, the slope of $U_{long}'$ for log ($U_{long}$) and the slope of $V_{long}'$ for log ($V_{long}$) become small. That is, as Ay and Ac become small, the slope of the output value for the input value becomes small in the gamma processing. Further, by expression (4) described previously, in the case where the difference between Ymin and Ymax is large, Ay and Ac are calculated as small values. Because of this, the main gamma processing of the present embodiment becomes gamma processing adjusted so that the larger the difference between Ymin and Ymax, the smaller the slope of the output value for the input value becomes.

Further, By and Bc are parameters that can adjust the correction constant that decreases the output value on the whole in the gamma processing. Specifically, as expressed by expression (5), as By and Bc become small, the correction constant becomes large. Further, by expression (4) described previously, in the case where Ymin is large, By and Bc are calculated as large values. Because of this, the main gamma processing of the present embodiment becomes gamma processing adjusted so that the correction constant that decreases the output value on the whole becomes large in the case where Ymin is large.

Further, for the short-time exposure image 44, the short-time gamma processing 409 is performed by expression (6) below. Here, it is assumed that the R, G, and B values of the short-time exposure image 44 are $R_{short}$, $G_{short}$, and $B_{short}$, respectively, and the R, G, and B values after the gamma correction are $R_{short}'$, $G_{short}'$, and $B_{short}'$, respectively. Further, it is assumed that the luminance value Y and the color difference values U and V of the short-time exposure image 44 are $Y_{short}$, $U_{short}$, and $V_{short}$, respectively, and the luminance value Y and the color difference values U and V after the gamma correction are $Y_{short}'$, $U_{short}'$, and $V_{short}'$, respectively. Furthermore, it is assumed that the exposure time of the short-time exposure image 44 is $t_{short}$ and the exposure time of the long-time exposure image 43 is $t_{long}$.

expression (6)

$$Y_{short} = 0.257 * R_{short} + 0.504 * G_{short} + 0.114 * B_{short}$$

$$U_{short} = -0.169 * R_{short} - 0.331 * G_{short} + 0.500 * B_{short}$$

$$V_{short} = 0.500 * R_{short} - 0.419 * G_{short} - 0.081 * B_{short}$$

$$Y'_{short} = Ay \cdot \frac{O_{max}}{\log(\text{Max})} \log\left(\frac{t_{long}}{t_{short}} Y_{short}\right) - By$$

$$U'_{short} = Ac \cdot \frac{O_{max}}{\log(\text{Max})} \log\left(\frac{t_{long}}{t_{short}} U_{short}\right) - Bc$$

$$V'_{short} = Ac \cdot \frac{O_{max}}{\log(\text{Max})} \log\left(\frac{t_{long}}{t_{short}} V_{short}\right) - Bc$$

$$R'_{short} = 1.00 * Y'_{short} + 1.402 * V'_{short}$$

$$G'_{short} = 1.00 * Y'_{short} - 0.344 * U'_{short} + 1.402 * V'_{short}$$

$$B'_{short} = 1.00 * Y'_{short} + 1.772 * U'_{short}$$

As in the case of the long-time exposure image 43, the main gamma processing performed for the short-time exposure image 44 by expression (6) is gamma processing adjusted so that the larger the difference between Ymin and Ymax, the smaller the slope of the output value for the input value becomes.

<HDR Combination Processing>

The main HDR combination processing at step S311 is explained. In the preliminary HDR combination processing, images after the preliminary gamma processing are combined, but in the main HDR combination processing, images after the main gamma processing are combined. The main HDR combination processing is substantially the same as the preliminary HDR combination processing, but the threshold value setting at the time of generating the composite coefficient map is different. Threshold values Th1' and Th2' in the main HDR combination processing are calculated from Th1 and Th2 in the preliminary HDR combination processing as expression (7) below by using the adjustment parameters Ay and By.

$$Th1' = Ay \cdot Th1 - By$$

$$Th2' = Ay \cdot Th2 - By$$

expression (7)

As explained above, in the present embodiment, based on the results of performing the preliminary gamma processing and the preliminary HDR combination processing for the long-time exposure image and the short-time exposure image, the adjustment parameters to adapt the gamma processing to the dynamic range of a scene are calculated. The main gamma processing to which the calculated adjustment parameters have been applied is performed for the long-time exposure image and the short-time exposure image, respectively, and the main HDR combination processing is performed for the obtained long-time exposure image and short-time exposure image after the gamma processing. As described above, by performing the gamma processing adapted to the dynamic range of a scene and the HDR combination of images after the gamma processing, it is made possible to generate a combined image of high image quality even by the combination processing with a small number of bits. Further, it is made possible to perform the HDR combination adapted to the dynamic range of a scene without the need to change the exposure conditions, such as a combination of exposure times for each scene.

In the above, the example is explained in which HDR combination is performed for the two kinds of image with different exposure times, but in the present embodiment, it is also possible to perform HDR combination of three or more kinds of image with different exposure times. At the time of performing HDR combination of three or more kinds of image with different exposure times, it is possible to perform combination in the order from the image with the longest exposure time or with the shortest exposure time. For example, the case is explained where three kinds of image with different exposure times are combined in the order from the image with the longest exposure time. First, the image with the longest exposure time and the image with the second longest exposure image are combined. The pixel value of the image, which is the results of the combination, is taken to be Out. Then, as expressed by expression (8) below, the image with the shortest exposure time is further combined.

$$\text{Out}'(x,y) = A \times I_{short}'(x,y) + (1-A) \times \text{Out}(x,y) \quad \text{expression (8)}$$

Here, Out' is the pixel value of the new image after the combination and $I_{short}'$ is the pixel value of the image with the shortest exposure time that is newly combined with Out. The composite coefficient A in expression (8) is generated based on the pixel value (here, $I_{short}'$) of the image with the shortest exposure time among the images to be combined.

In the present embodiment, explanation is given on the assumption that the image processing unit 209 is included in the image capturing apparatus 101, but the configuration is not limited to this and the image processing unit 209 may be included in another apparatus or device capable of communicating with the image capturing apparatus 101. Alternatively, it may also be possible to configure the image processing unit 209 as an image processing apparatus capable of communicating with the image capturing apparatus 101.

Second Embodiment

In the present embodiment, the case where the first embodiment is applied to a moving image is explained. In the present embodiment, the preliminary gamma processing and the preliminary HDR combination are not performed and by using the adjustment parameters calculated based on the output image of the previous frame of the successive frames of a moving image, the gamma characteristics applied to the main gamma processing of the current frame are adjusted. Explanation of the processing in common to that of the first embodiment is omitted.

Figure 7:
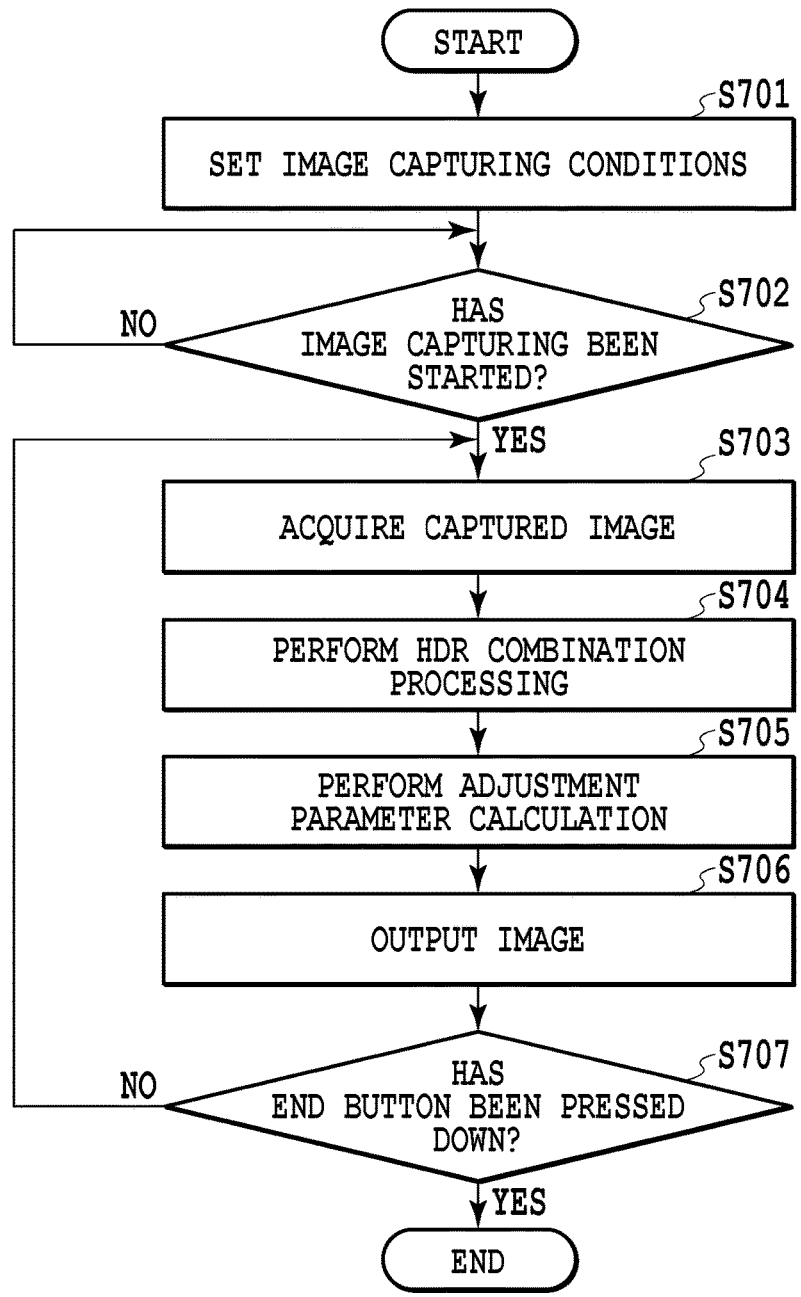
FIG. 7 is a flowchart of entire processing of an image capturing apparatus in a second embodiment.
Figure 8:
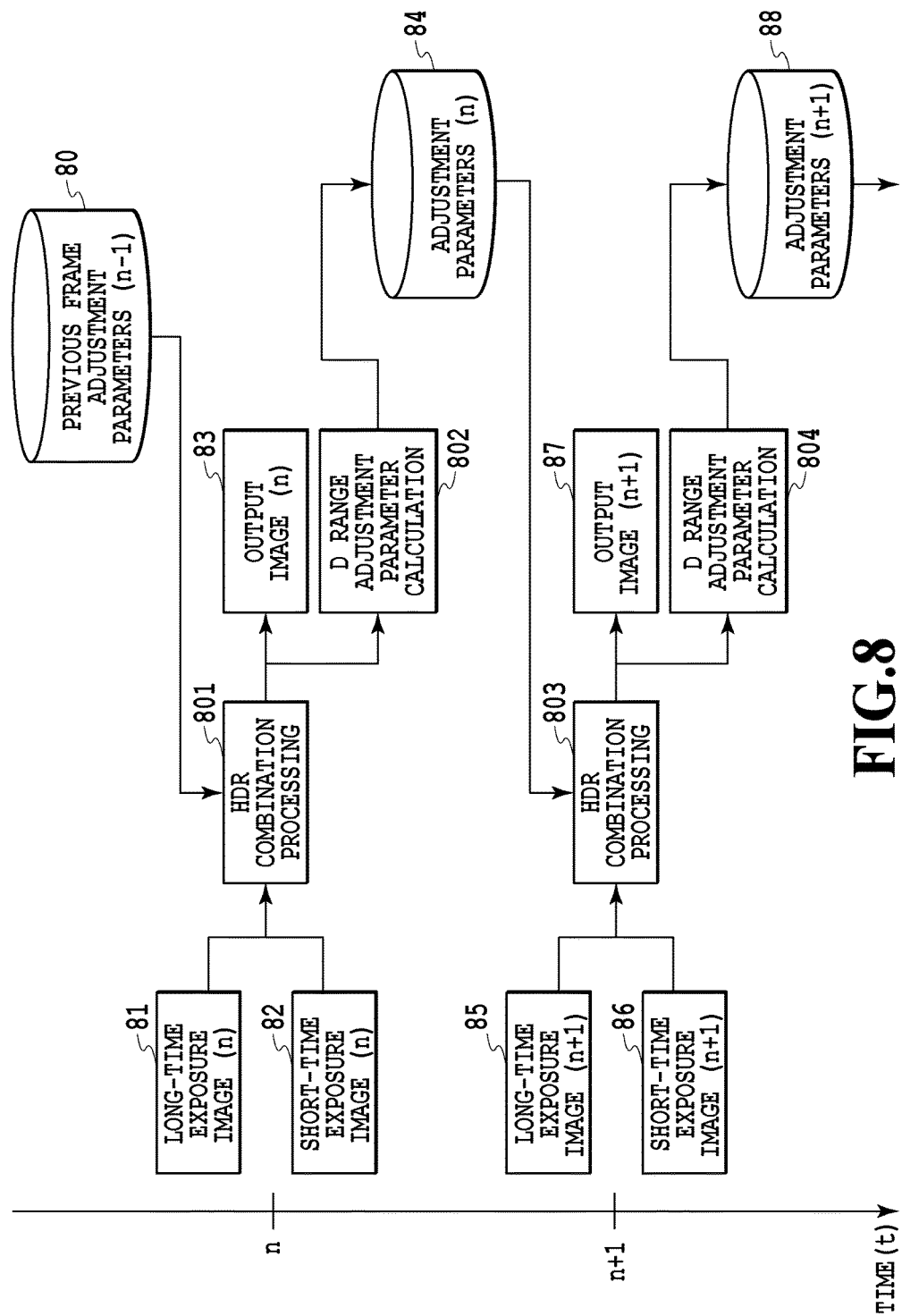
FIG. 8 is a diagram showing details of image processing performed by an image processing unit in the second embodiment.

FIG. 7 is a diagram showing a flowchart of entire processing of the image capturing apparatus 101 in the present embodiment. FIG. 8 is a diagram showing details of image processing performed by the image processing unit 209 in the present embodiment.

At step S701, a user sets exposure conditions, such as the f-stop of the lens and the ISO speed, via the operation button 105. The exposure time is not changed for each scene, but a condition prepared in advance is set.

At step S702, the control unit 206 determines whether or not the image capturing button 103 has been pressed down. In the case where the image capturing button 103 has been pressed down, the processing advances to step S703 and in the case where the image capturing button 103 has not been pressed down, the processing returns to step S701.

At step S703, the control unit 206 sets the focus position by auto focusing and the exposure conditions (image capturing parameters) set by a user at step S701 to the image capturing system control unit 205 and instructs the image capturing system control unit 205 to start the image capturing operation. Then, the image capturing system control unit 205 captures a plurality of images with different exposure times (exposure bracket image capturing) based on the set exposure conditions and acquires a long-time exposure image and a short-time exposure image. Here, in the nth frame, a long-time exposure image 81 and a short-time exposure image 82 are acquired. The acquired long-time exposure image 81 and short-time exposure image 82 are input to the image processing unit 209.

At step S704, the image processing unit 209 performs HDR combination processing 801 for the long-time exposure image 81 and the short-time exposure image 82 acquired at step S703 and generates an output image 83 of the current frame. In the HDR combination processing 801 of the present embodiment, the same white balance processing as that at step S304, the same demosaicking processing as that at step S305, the same main gamma processing as that at step S310, and further, the same main HDR combination processing as that at step S311 are performed. However, in the present embodiment, the preliminary gamma processing and the preliminary HDR combination processing are not performed and by using the adjustment parameters calculated based on the output image (reference image) of the previous frame, the gamma characteristics applied to the main gamma processing of the current frame are adjusted. Here, adjustment parameters 80 are calculated in the (n−1)th frame based on an output image of the frame. Further, the calculated adjustment parameters 80 are held by the holding unit and are read from the holding unit in the nth frame and used in the main gamma processing and the main HDR combination processing for the long-time exposure image 81 and the short-time exposure image 82. In the case immediately after the start of the processing, in order to perform the HDR combination processing for the first frame, Ay=0, By=0, Ac=0, and Bc=0 are set.

At step S705, the image processing unit 209 performs adjustment parameter calculation 802 based on the output image 83 of the current frame generated at step S704. In the adjustment parameter calculation 802 of the present embodiment, first, the same histogram calculation as that at step 308 is performed. That is, for the output image 83 of the current frame, the histograms of the luminance value Y and the R, G, and B values are calculated. Then, based on the calculated histograms of the output image 83 and the adjustment parameters 80 calculated in the previous frame, adjustment parameters 84 are calculated by expression (9) below.

$$\begin{cases} Ay(n) = \dfrac{M_{out}}{\dfrac{Y\max + By(n-1)}{Ay(n-1)} - \dfrac{Y\min + By(n-1)}{Ay(n-1)}} \\ By(n) = Ay(n) \cdot \dfrac{Y\min + By(n-1)}{Ay(n-1)} \end{cases} \quad \text{expression (9)}$$

$$\begin{cases} Ac(n) = \dfrac{M_{out}}{\dfrac{C\max + Bc(n-1)}{Ac(n-1)} - \dfrac{C\min + Bc(n-1)}{Ac(n-1)}} \\ Bc(n) = Ac(n) \cdot \dfrac{C\min + Bc(n-1)}{Ac(n-1)} \\ C\max = \max(R\max, G\max, B\max) \\ C\min = \min(R\min, G\min, B\min) \end{cases}$$

Here, Ay (n), By (n), Ac (n), and Bc (n) are the adjustment parameters 84 calculated in the current frame and Ay (n−1), By (n−1), Ac (n−1), and Bc (n−1) are the adjustment parameters 80 calculated in the previous frame. Further, Ymax, Ymin, Rmax, Rmin, Gmax, Gmin, Bmax, and Bmin are the maximum values and the minimum values of Y, R, G, and B calculated from the histograms of the output image 83 of the current frame.

At step S706, the image processing unit 209 outputs the output image 83 generated at step S704 to the encoder unit 210, to the PC/media 213 via the media I/F 211, and so on.

At step S707, the control unit 206 determines whether or not the end button has been pressed down. In the case where the end button has been pressed down, the processing of the flow ends and in the other cases, the processing returns to step S703 and the processing at steps S703 to S707 is repeated.

As explained above, in the present embodiment, the adjustment parameters calculated based on the output image of the previous frame of the successive frames of a moving image are applied to the gamma processing and the HDR combination of the current frame. Due to this, it is possible to perform the gamma correction and the HDR combination adapted to the dynamic range of a scene. Further, at the time of capturing images of a moving image also, by performing HDR combination of the images after the gamma processing, it is made possible to generate a combined image of high image quality even by the combination processing with a small number of bits. Furthermore, without the need to change the combination of exposure times for each scene, it is made possible to perform the gamma processing and the HDR combination adapted to the dynamic range of a scene.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

It is possible for the image processing apparatus of the present invention to generate a combined image of high image quality by HDR combination with a small number of bits without the need to prepare a very large number of parameters for scenes of a variety of dynamic ranges.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-125786 filed Jun. 24, 2016, which is hereby incorporated by reference wherein in its entirety.

What is claimed is:

1. An image processing apparatus that generates a combined image by performing gamma processing and combination processing for a plurality of images obtained by capturing images of the same image capturing-target scene under different exposure conditions, the image processing apparatus comprising:
    an acquisition unit configured to acquire adjustment parameters that adjust gamma characteristics applied to the gamma processing in accordance with a dynamic range of the image capturing-target scene;
    a gamma processing unit configured to perform the gamma processing to which adjustment parameters acquired by the acquisition unit have been applied for the plurality of images; and
    a combination unit configured to generate the combined image by performing the combination processing for the plurality of images for which the gamma processing has been performed by the gamma processing unit.

2. The image processing apparatus according to claim 1, further comprising:
    a preliminary gamma processing unit configured to perform preliminary gamma processing based on predetermined gamma characteristics for the plurality of images; and
    a preliminary combination unit configured to combine the plurality of images for which the preliminary gamma processing has been performed, wherein
    the acquisition unit calculates, by taking combination results by the preliminary combination unit as a reference image, the adjustment parameters based on the reference image.

3. The image processing apparatus according to claim 1, wherein
    the plurality of images is images captured in one frame of successive frames of a moving image, and
    the acquisition unit calculates, by taking the combined image generated for the previous frame of the one frame as a reference image, the adjustment parameters based on the reference image.

4. The image processing apparatus according to claim 2, further comprising:
    a calculation unit configured to calculate a maximum value and a minimum value of a pixel of the reference image, wherein
    the acquisition unit calculates the adjustment parameters based on a maximum value and a minimum value calculated by the calculation unit.

5. The image processing apparatus according to claim 4, wherein
    the adjustment parameters adjust the gamma characteristics so that the larger a difference between the maximum value and the minimum value, the smaller a slope of an output value for an input value in the gamma processing is made, and the larger the minimum value, the larger a correction constant that reduces an output value on the whole in the gamma processing is made.

6. The image processing apparatus according to claim 4, wherein the maximum value and the minimum value are calculated for each of luminance, R, G, and B.

7. The image processing apparatus according to claim 4, wherein
the calculation unit calculates histograms of the reference image and calculates the maximum value and the minimum value by using calculated histograms.

8. The image processing apparatus according to claim 1, wherein
the combination unit changes a composite coefficient of each image in the combination processing based on the adjustment parameters and performs combination processing in accordance with a dynamic range of the image capturing-target scene.

9. The image processing apparatus according to claim 1, wherein
the combination processing is HDR combination.

10. The image processing apparatus according to claim 1, wherein
the plurality of images includes at least a first image captured with a relatively short exposure time and a second image captured with a relatively long exposure time.

11. The image processing apparatus according to claim 1, wherein
the gamma processing is log gamma correction on a YUV color space, and
in a case where a pixel value in a YUV color space of the image is taken to be x, a pixel value in a YUV color space after gamma correction is taken to be y, and a coefficient set in advance is taken to be k, adjustment parameters of the gamma processing are set as A and B in $y = A \cdot k \cdot \log(x) - B$.

12. An image processing method of generating a combined image by performing gamma processing and combination processing for a plurality of images obtained by capturing images of the same image capturing-target scene under different exposure conditions, the method comprising the steps of:
acquiring adjustment parameters that adjust gamma characteristics applied to the gamma processing in accordance with a dynamic range of the image capturing-target scene;
performing the gamma processing to which adjustment parameters acquired at the acquisition step have been applied for the plurality of images; and
generating the combined image by performing the combination processing for the plurality of images for which the gamma processing has been performed at the gamma processing step.

13. A non-transitory computer readable storage medium storing a program for causing a computer to function as an image processing apparatus that generates a combined image by performing gamma processing and combination processing for a plurality of images obtained by capturing images of the same image capturing-target scene under different exposure conditions, the image processing apparatus comprising:
an acquisition unit configured to acquire adjustment parameters that adjust gamma characteristics applied to the gamma processing in accordance with a dynamic range of the image capturing-target scene;
a gamma processing unit configured to perform the gamma processing to which adjustment parameters acquired by the acquisition unit have been applied for the plurality of images; and
a combination unit configured to generate the combined image by performing the combination processing for the plurality of images for which the gamma processing has been performed by the gamma processing unit.

* * * * *